April 28, 1931. O. B. FITTS 1,802,711
SURFACE CUTTER AND CULTIVATOR
Filed Feb. 12, 1930
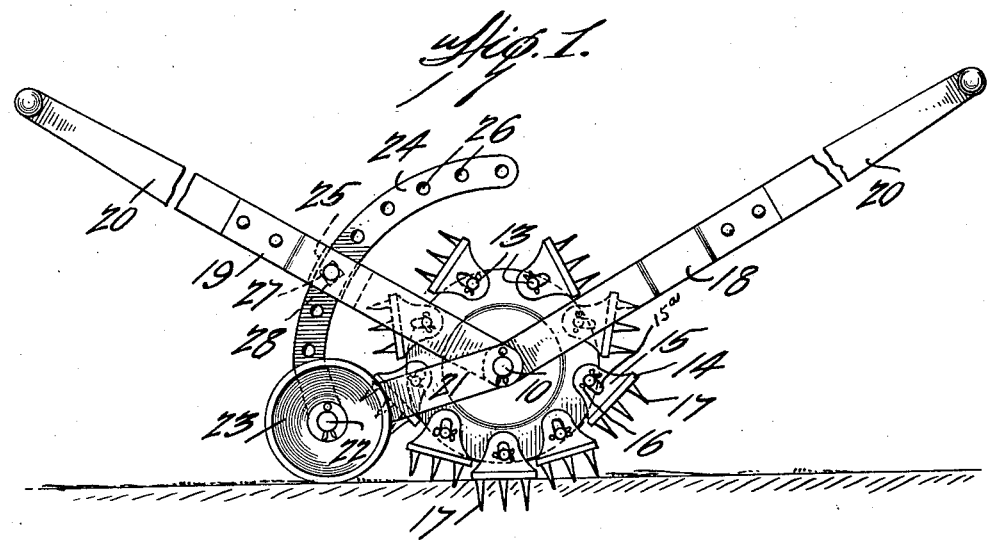
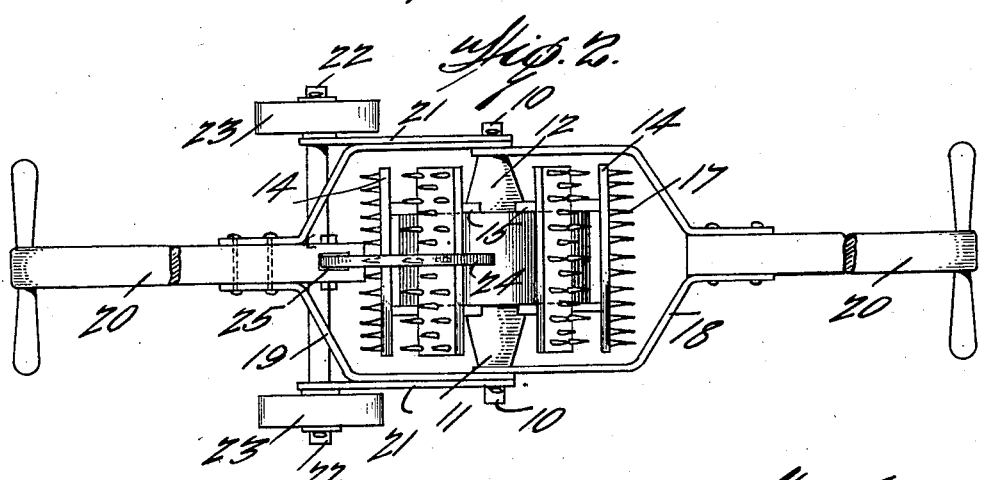
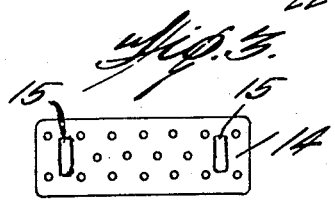
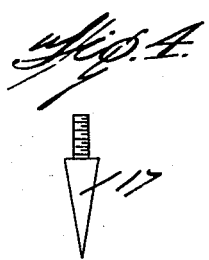
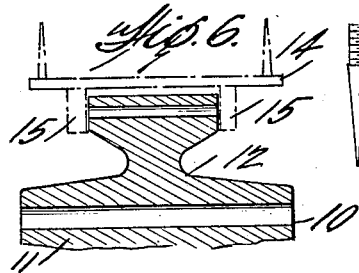
Inventor,
Oscar B. Fitts,
By
Attorney Patented Apr. 28, 1931

1,802,711

UNITED STATES PATENT OFFICE

OSCAR B. FITTS, OF CHERRYDALE, VIRGINIA

SURFACE CUTTER AND CULTIVATOR

Application filed February 12, 1930. Serial No. 427,810.

This invention relates to that form of cultivating implements intended for perforating turf and top soil in order that air, water, and fertilizing materials may more readily penetrate the soil and reach the subsoil and superficial as well as the deep seated grass roots.

It is an object of the invention furthermore to provide knife-like spikes or cutting instrumentalities instead of ordinary spikes, since it has been found in practice that these knife-like spikes penetrate the soil more easily and minimize distortion and bruising of the grass roots.

It is an object furthermore of this invention to provide shoes or heads and means for mounting them in a manner that they will act as walkers as they successively come in contact with the soil and when force is exerted on the implement in either direction or as it may be termed for moving the implement forwardly or rearwardly.

It is a further object of this invention to provide means whereby the aforesaid instrumentalities may be elevated and supported on a truck-like structure whereby the implement may be moved from location to location with the cultivating instrumentalities in an inoperative position.

With the foregoing and other objects in view, the invention consists in the details of construction, and in the arrangement and combination of parts to be hereinafter more fully set forth and claimed.

In describing the invention in detail, reference will be had to the accompanying drawings forming part of this application in which like characters denote corresponding parts in the several views, and in which—

Figure 1 illustrates a view in side elevation of an implement embodying the invention;

Figure 2 illustrates a top plan view thereof;

Figure 3 illustrates a plan view of one of the shoes;

Figure 4 illustrates a face view of one of the cultivating units;

Figure 5 illustrates a view in side elevation of one of the knife-like spikes; and Figure 6 illustrates a sectional view of the wheel and the shoe in dotted lines applied thereto.

In the present embodiment of the invention, the member which is mounted on a shaft 10 rotates with or on said shaft, that is to say, the member may be secured to the shaft to rotate with it or it may freely rotate on the shaft. The said member may consist of a wheel having a hub portion 11 and a relatively heavy rim 12 which carries trunnions or rods such as 13. The trunnions may extend transversely through or be integral with the said rim, as those skilled in the art will understand. Instead of employing a wheel, the hub may have radial arms supplied with trunnions, although at present the wheel construction is preferred.

Shoes 14 have lugs 15 provided with slots 15ª which receive the trunnions and the lugs may be secured to the trunnions by suitable fastenings 16, such as cotter pins or the like. By this means, the shoes are oscillatively or swingingly mounted on the trunnions. The shoes are provided with a plurality of knife-like spikes 17 which penetrate the soil and operate in the manner heretofore described for the purpose indicated. It is seen from an inspection of the drawing that the slots in the lugs permit the periphery of the wheel to ride on the shoes and force the spikes into the soil and that when the spikes are approaching the soil, the shoes are in an inclined position and the edges of the shoes are in contact with the periphery of the wheel.

The shaft 10 extends beyond the ends of the hub and pairs of front tongue irons and pairs or rear tongue irons 18 and 19 are loosely mounted on the shaft, the tongue irons each having a tongue 20 by which power may be applied for moving the implement.

From an inspection of the drawing, it will be apparent that when the device so far described is pushed or pulled, the spikes of the shoes will successively engage the soil and that the spikes at the edge of the shoes will first take hold and start to penetrate the turf or top soil and that the other rows of spikes will successively come into contact with the turf as the machine is moved over it. In other words, when the first spikes engage the turf, the shoe is in a slightly inclined position and then at this point the shoe gradually assumes a horizontal position and then is inclined in the opposite direction and the spikes are in a straight line from the ground. This action of the spikes provides for enlarging the holes or punctures in the subsoil without the surface being roughened to any appreciable degree and contributes to better results than are attainable by the employment of the ordinary fixed-spike roller.

As a means for elevating the cultivating instrumentalities just described when the machine is to be moved when inoperative, links 21 are oscillatively mounted on the shaft and the links extend outwardly beyond the shoes; and the said links have a shaft or axle 22 on which ground or traction wheels 23 are mounted. The shaft has a segmental arm 24 extending upwardly therefrom and this arm projects through a slot or clearance 25 in one of the tongues 20. The arm 24 has a plurality of apertures 26 and the tongue has apertures such as 27 adapted to register with any one of the aforesaid apertures in the arm in order that a pin 28 may be applied to the apertures for coupling the tongue to the arm at different positions. When so coupled, downward pressure on the outer end of the tongue will result in lifting the cultivating instrumentalities of the machine out of operative position and will throw the weight on the ground or traction wheels, in order that the machine may be moved as stated from location to location.

When the machine is in operation, however, it will be apparent that it is unsupported by wheels and that its full weight is imparted to the shoes and the spikes carried thereby, as the member carrying the shoes rotates on or with the shaft.

A machine of this character is of special utility in connection with the perforating of greens of golf courses and it has proven satisfactory and efficient in use in this connection although, of course, the inventor does not wish to be limited with respect to its employment.

While the application discloses the so-called shoes as movable radially of the rotative member, obviously the shoes may carry pivots which oscillate and more substantially radially of the rotative member in slots of the rotative member; hence, the inventor does not wish to be limited with relation to these features, except as bound by the language of the claims.

I claim:

1. In a surface cutter and cultivator, a rotatively mounted member, fixed pivots concentrically positioned on said member, oscillatively mounted shoes on the pivots, spikes projecting from the faces of said shoes, and means for imparting motion to the rotative member.

2. In a surface cutter and cultivator, a rotatively mounted member, fixed pivots concentrically positioned on said member, shoes oscillatively mounted on the pivots, knife-like spikes projecting from the faces of said shoes, and means for imparting motion to the rotative member.

3. In a surface cutter and cultivator, a rotatively mounted member, fixed pivots concentrically positioned on said member, oscillatively mounted shoes on the pivots, spikes positioned longitudinally and transversely on the shoe, and means for imparting motion to the rotative member.

4. In a surface cutter and cultivator, a rotatively mounted member, fixed pivots concentrically positioned on said member, oscillatively mounted shoes on the pivots, knife-like spikes positioned longitudinally and transversely on the shoe, and means for imparting motion to the rotative member.

5. In a surface cutter and cultivator, a rotatively mounted member, pivots concentrically positioned on the edge of said member, shoes having slotted lugs, the said lugs being oscillatively mounted on the pivots, knife-like spikes projecting from the outer face of the shoes, and means for imparting motion to the rotative member.

6. In a surface cutter and cultivator, a rotatively mounted cylindrical member, pivots extending from the sides of the member substantially at its periphery, shoes having slotted lugs into which the pivots project for oscillatively mounting the shoes on the pivots, and spikes carried by the shoes.

7. In a surface cutter and cultivator, a rotatively mounted member, fixed pivots concentrically positioned on said member, oscillatively mounted shoes on the pivots, spikes projecting from the faces of said shoes, means for imparting motion to the rotative member, links connected to the axis of the rotative member, carrier wheels to which the ends of said links are connected, a tongue connected to the axis of the rotative member, an arm supported by the carrier wheels and extending upwardly therefrom, and means for pivotally coupling the tongue and arm at different positions of adjustment whereby pressure on the outer end of the tongue elevates the rotative member and causes the same to be supported by the carrier wheels.

8. In a surface cutter and cultivator, a rotative member, pivots extending from the sides of the member substantially at its periphery, shoes having lugs mounted on the said pivots, the said shoes being oscillative with respect to the periphery of the rotative member, and spikes carried by the shoes.

9. In a surface cutter and cultivator, a rotative cylindrical member, pivots extending from the sides of the member substantially at its periphery, shoes carried by the pivots and oscillative with respect to the periphery of the member, and spikes carried by the shoes and projecting from the outer face of the shoes.

10. In a surface cutter and cultivator, a rotative member, a member pivotally mounted on the rotative member and having a portion thereof projecting beyond the periphery of the rotative member, and cutting and penetrating knives carried by the second mentioned member.

11. In a surface cutter and cultivator, a rotative member, and cutting and penetrating knives oscillatively carried by the rotative member and projecting beyond the periphery of the said rotative member.

12. In a surface cutter and cultivator, a rotative member adapted to be rotated over a surface to be cultivated, a shoe, cutting and penetrating knives carried by the shoe, means for oscillatively mounting the shoe on the rotative member at its periphery, whereby the rotative member and shoe have movement with relation to each other substantially radially of the rotative member.

13. In a surface cutter and cultivator, a rotative member adapted to be rotated over a surface to be treated, elements having cutting and penetrating knives, and means for assembling the elements and rotative member for movement one with relation to the other substantially radially of the rotative member, the said elements being oscillative with relation to said member.

14. In a surface cultivator, a rotative member, an element having cutting and penetrating knives, a pivotal connection between the member and the element, and mounted to permit relative movement of the member and element substantially radially of the member.

OSCAR B. FITTS.